United States Patent [19]
Hilerich, Jr.

[11] Patent Number: 5,934,438
[45] Date of Patent: Aug. 10, 1999

[54] GRAVITY CONVEYOR HAVING VELOCITY AND BACK PRESSURE CONTROL

[75] Inventor: Thomas Anthony Hilerich, Jr., Louisville, Ky.

[73] Assignee: Sandvik Sorting Systems, Inc., Louisville, Ky.

[21] Appl. No.: 08/897,151

[22] Filed: Jul. 18, 1997

[51] Int. Cl.⁶ .................................................. B65G 13/00
[52] U.S. Cl. ......................................................... 193/35 A
[58] Field of Search .......................... 193/35 A; 198/534, 198/832

[56] References Cited

U.S. PATENT DOCUMENTS

| 3,058,564 | 10/1962 | Kabat | 193/35 A |
| 3,321,057 | 5/1967 | De Good . | |

FOREIGN PATENT DOCUMENTS

| 2805818 | 8/1979 | Germany | 193/35 A |
| 308935 | 9/1978 | U.S.S.R. | 193/35 A |

Primary Examiner—James R. Bidwell
Attorney, Agent, or Firm—Burns, Doane, Swecker & Mathis, L.L.P.

[57] ABSTRACT

A gravity conveyor is comprised of freely rotatable rollers which include non-displaceable rollers rotatable about stationary axes, and weight-sensitive rollers which are downwardly displaceable under the weight of heavy articles. The non-displaceable rollers are arranged in groups. Upper portions of the non-displaceable rollers of each group define a profile plane. The profile planes of successive groups are mutually parallel and offset downwardly from one another to form a stepped conveying path. When the weight-sensitive rollers are depressed by heavy articles, they will engage, and be braked by, braking rollers disposed therebeneath. An upper portion of each weight-sensitive roller lies in the profile plane of the immediately upstream group of non-displaceable rollers. The weight-sensitive rollers can be mounted on a lever which, when the weight-sensitive rollers are depressed, causes an upstream brake to engage upstream rollers, thereby reducing back pressure applied by upstream articles against downstream articles.

17 Claims, 3 Drawing Sheets

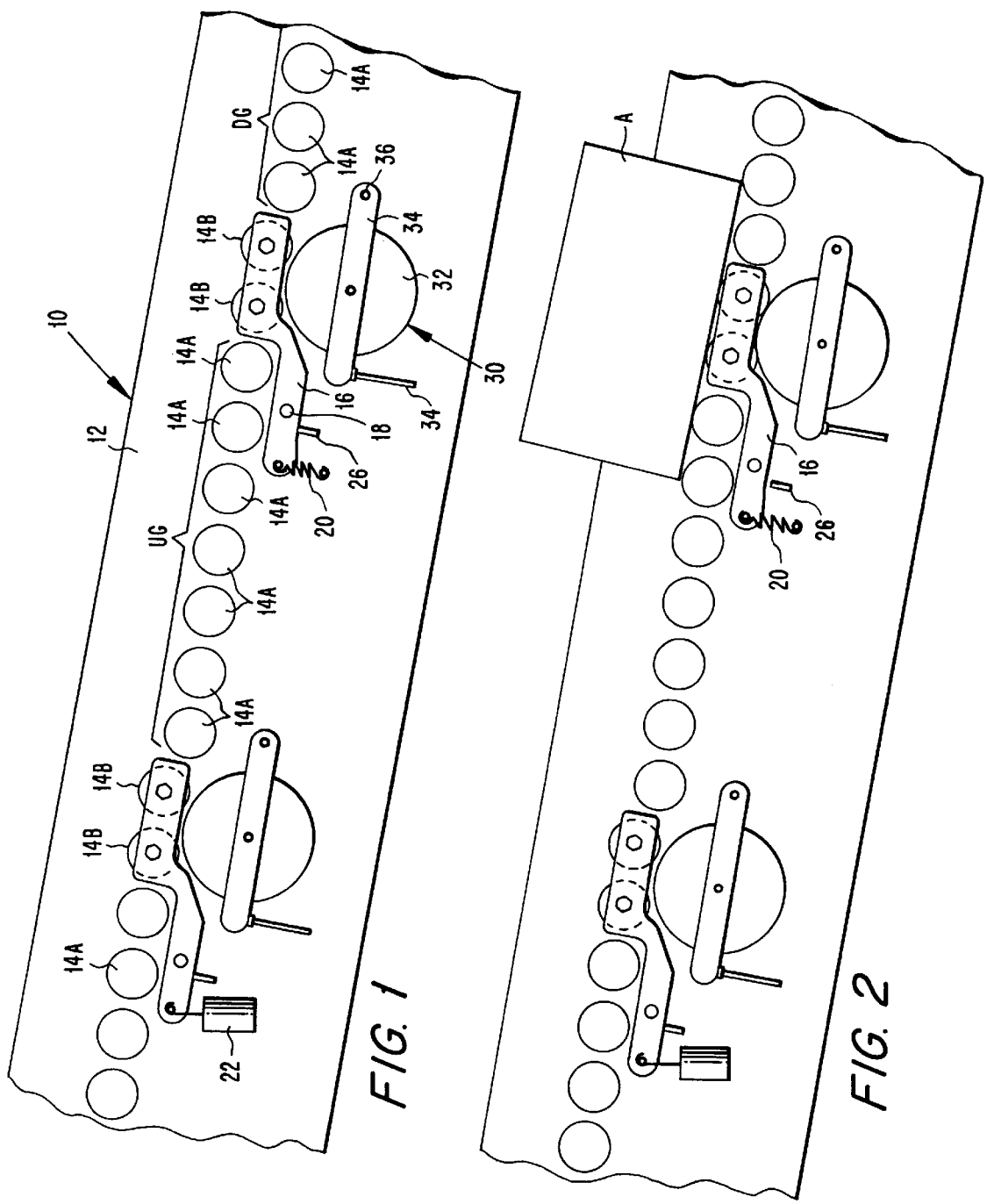

GRAVITY CONVEYOR HAVING VELOCITY AND BACK PRESSURE CONTROL

BACKGROUND OF THE INVENTION

The present invention relates to conveyors and in particular to a gravity conveyor having a velocity and back pressure control for items being conveyed.

Gravity conveyors comprise non-driven rollers or skate wheels that utilize a difference in elevation from the inlet to the discharge as a conveying force. Two problems exist which limit the use of gravity conveyors. A first problem is that heavy articles may travel at an excessively high velocity down the gravity conveyors. Heavy articles traveling at high speeds can cause damage to other downstream articles or be a hazard to people.

A second problem concerns a back pressure. That is, if articles are blocked from exiting a gravity conveyor and more articles are introduced into the inlet, back pressure acting against the downstream article(s) grows as the gravity conveyors fills. Thus the articles near the exit of the gravity conveyor experience high pressure from the upstream articles.

In order to alleviate the first problem, it is necessary to reduce the speed of the heavy articles being conveyed. One conventional way of achieving this is to design at least some of the gravity rollers as so-called centrifugal brake rollers which include therein a braking mechanism that slows the roller (and thus the articles) in response to increased centrifugal force. Since the magnitude of centrifugal force is a function of the rotary speed of the roller, a certain speed control is established. However, centrifugal brake rollers are not suitable in systems which convey both heavy and light articles. That is, if the centrifugal brake rollers are sized to provide braking force for heavy articles, then the light articles may become hung up thereon due to the high friction. On the other hand, if the brake rollers are sized to enable light-weight articles to easily pass thereover, then the braking influence on heavy articles will be nominal. Also, a centrifugal braking roller does not alleviate the above-described back pressure problems, because it only functions to brake moving articles; stationary articles will not be subjected to an appreciable braking force.

A known technique for relieving back pressure involves sensing the weight of the articles. For example, in FIG. 8 there is depicted a gravity conveyor comprised of freely rotatable gravity rollers 10. The uppermost portions of the gravity rollers define a profile plane P'. A fluid actuated brake pad 12 is positioned to engage one or more of the gravity rollers. The brake pad is actuated by a sensor roller 14 that is mounted on a trip bar 15. The sensor roller 14 lies in the conveying path at an elevation above the profile plane P'. The article A, due to its weight, will depress the sensor roller and actuate a sensor 16 which is electrically connected to the brake pad 12 to cause the latter to be extended against an upstream gravity roller to decelerate an upstream article or hold it in place. This technique is relatively expensive and has limited utility when used in systems that convey articles which include light-weight articles that may become hung-up when they abut against the sensor roller, i.e. the light-weight articles may not be heavy enough to depress the sensor roller.

A weight-sensitive braking mechanism is also disclosed in De Good U.S. Pat. No. 3,321,057 wherein a sensing roller is spring biased upwardly to an elevation higher than the profile plane defined by the upstream gravity rollers. An article exceeding a predetermined weight will depress the sensing roller downwardly against a brake pad to apply a braking force to the sensing roller which is transmitted to the article. This, however, creates a problem similar to that disclosed earlier in that light-weight articles may become hung-up against the upstanding sensing roller. Also, this type of device does not alleviate back pressure.

SUMMARY OF THE INVENTION

The present invention relates to a gravity conveyor for conveying articles. The conveyor comprises freely rotatable rotary elements defining a downwardly inclined conveying path. Some of the rotary elements comprise non-displaceable rotary elements rotatable about parallel stationary axes and arranged in groups. Uppermost portions of the non-displaceable rotary elements in each group define a profile plane. The profile planes of the upstream and downstream groups are non-coplanar with one another, with the rotary elements of the downstream group being offset downwardly with respect to the profile plane of the upstream group. The upstream and downstream groups are separated by a weight-sensitive one (or more than one) of the rotary elements. The weight-sensitive rotary element is mounted for rotation about a displaceable axis oriented parallel to the stationary axes. The weight-sensitive rotary element is biased upwardly for positioning an uppermost portion of the weight-sensitive rotary element within the profile plane of the upstream group. A brake is disposed beneath the weight-sensitive rotary element. The weight-sensitive rotary element is downwardly displaceable in response to being traversed by an article having a weight greater than the upward biased applied to the weight-sensitive rotary element, whereby the weight-sensitive rotary element engages the brake and is braked thereby.

The brake preferably constitutes a first brake, and the conveyor further comprises a frame having upstream and downstream ends and mounted for pivotal movement about an axis located intermediate the upstream and downstream ends. The axis extends parallel to the axes of the rotary elements. The weight-sensitive rotary element is mounted on the frame adjacent the downstream end thereof. A second brake is disposed upstream of the first brake and is movable upwardly by the upstream end of the frame and into braking engagement with at least one of the rotary elements, when the weight-sensitive rotary element is displaced downwardly by an article.

In another aspect of the invention, the first brake can be omitted, whereby only the second brake is employed to provide back pressure relief.

BRIEF DESCRIPTION OF THE DRAWINGS

The objects and advantages of the invention will become apparent from the following detailed description of preferred embodiments thereof in connection with the accompanying drawing in which like numerals designate like elements and in which:

FIG. 1 is a schematic side elevational view of a gravity conveyor in accordance with one embodiment of the present invention;

FIG. 2 is a view similar to FIG. 1 depicting the braking of an article being conveyed;

DETAILED DESCRIPTION OF PREFERRED EMBODIMENTS OF THE INVENTION

A gravity conveyor 10 for conveying articles, especially articles of different size, shape, and weight, is depicted in FIGS. 1 and 2. The conveyor 10 includes fixed walls 12, only one of which is depicted in the figures, and a plurality of freely rotatable rotary elements 14A and 14B mounted for rotation on the walls 12. The axes of rotation of the rotary elements 14A, 14B are parallel to one another. The rotary elements, which may comprise rollers or skate wheels for example, together define a downwardly inclined conveying path for guiding a gravitational flow of articles A.

The rotary elements 14A constitute non-displaceable rotary elements in that their axes of rotation are stationary. On the other hand, the rotary elements 14B constitute weight-sensitive rotary elements whose axes of rotation are vertically displaceable.

Figure 3:
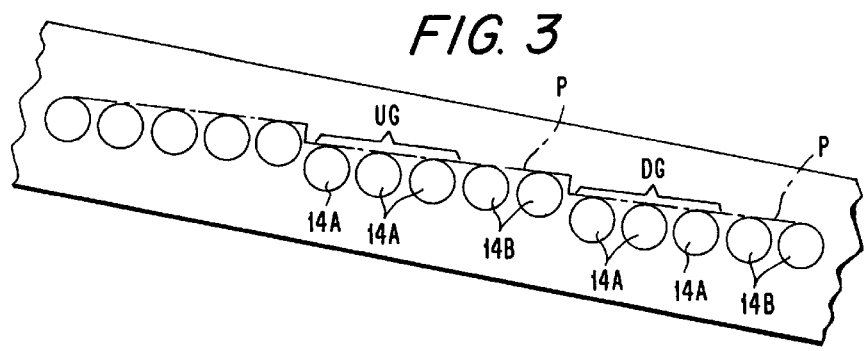
FIG. 3 is a schematic representation of the conveyor depicted in FIG. 1 to show the relationship between various profile planes thereof.

The non-displaceable rotary elements 14A are arranged in groups, with upper portions of the rotary elements 14A of each group defining a profile plane P, as shown more clearly in FIG. 3. The profile plane of each group of rollers 14A is non-coplanar with the profile plane of an adjacent upstream or downstream group of rollers 14A. The profile planes are preferably parallel to one another. It will be appreciated that a given group of non-displaceable rotary elements 14A may constitute a downstream group with respect to the previous group of non-displaceable rotary elements, or it may constitute an upstream group with respect to the next group of non-displaceable rotary elements 14A. In FIG. 1, one of the groups of non-displaceable rotary elements has been designated as an upstream group UG, and the next group of non-displaceable rotary elements has been designated as a downstream group DG, for purposes of discussion. It will thus be appreciated that the profile planes of the upstream and downstream groups UG, DG are non-coplanar with one another and that the rotary elements of the downstream group DG are offset downwardly with respect to the profile plane P of the upstream group UG.

The upstream and downstream groups UG, DG are separated from one another by at least one weight-sensitive rotary element 14B. Preferably, there are more than one, e.g. two, weight-sensitive rotary elements 14B separating respective groups of non-displaceable rotary elements.

The weight-sensitive rotary elements 14B are mounted on a frame, or lever, 16 which is mounted for pivotal movement about an axis 18 located intermediate the upstream and downstream ends of the frame 16. The axis 18 extends parallel to the axes of rotation of the rotary elements 14A, 14B. The weight-sensitive rotary elements 14B are mounted on the frame 16 adjacent the downstream end thereof. The upstream end of the frame 16 is biased downwardly by either a spring 20, or alternatively by a counterweight 22, both of which being depicted in FIG. 1. The spring or counterweight thus applies an upward force to the weight-sensitive rotary elements 14B. A stop element 26, which may be vertically adjustable, is positioned on a wall 12 to define an upward-most position for the weight-sensitive rotary elements 14B, whereby the upper portions of those rotary elements 14B lie within the profile plane P of the upstream group UG of rotary elements 14A, as is evident from FIG. 3. Accordingly, articles A traveling downwardly on the conveyor will never encounter a rotary element which projects above a profile plane P in which the article is traveling. In other words, an article (especially a light-weight article) will encounter no raised obstructions which could tend to slow or even stop the movement of the article.

Situated beneath the weight-sensitive rotary elements 14B is a brake 30 which could be of any suitable type, such as a fixed brake pad, or a roller type of brake. Depicted in FIG. 1 is a roller type of brake 32, which may comprise a conventional centrifugal brake roller, or any other suitable type of brake roller. The brake roller 32 is mounted for rotation on a support 34 which could be fixed against movement, but is preferably rotatable about a pivot 36 disposed at one end of the support 34. The other end of the support tends to rest upon a stop 34.

In operation, as articles travel downwardly along the gravity conveyor, it is assumed that articles whose weight is less than a predetermined reference weight, are travelling at an acceptable rate of speed. Those articles will pass over the weight-sensitive rotary elements 14B without depressing them against the brake roller 32. However, the strength of the spring 20, or the weight of the counterweight 22, is pre-determined to enable heavy articles to downwardly displace the weight sensitive rotary elements 14B into engagement with the brake roller 32, as depicted in FIG. 2. When that occurs, the brake roller will apply a braking force to the weight-sensitive rollers 14B, thereby decelerating the rollers 14B as well as the article A. By providing weight-sensitive rotary elements 14B and associated braking rollers 32 spaced along the length of the gravity conveyor, the speed of heavy articles can be effectively controlled. Since a vertical step is formed between the weight-sensitive rotary elements 14B and the immediate downstream group of rotary elements 14A, the front of the article can dip downwardly, to enable most, if not all, of the weight of the article to be applied to the weight-sensitive rotary elements 14B, as depicted in FIG. 2. Thus, the condition will not occur wherein most of the weight of the article is supported by the non-displaceable rotary elements 14A.

The brake rollers are preferably lagged, i.e. provided with a high-friction layer extending around their outer circumference, in order to maximize the braking action.

It will be appreciated that the embodiment of the invention disclosed in connection with FIGS. 1 and 2 will effectively control the speed of heavy articles, but will not relieve back pressure that is imposed on the articles. That is, in the event that articles become backed-up (i.e., stopped) on the conveyor, they may be subjected to excessive back pressure by upstream articles.

Figure 4:
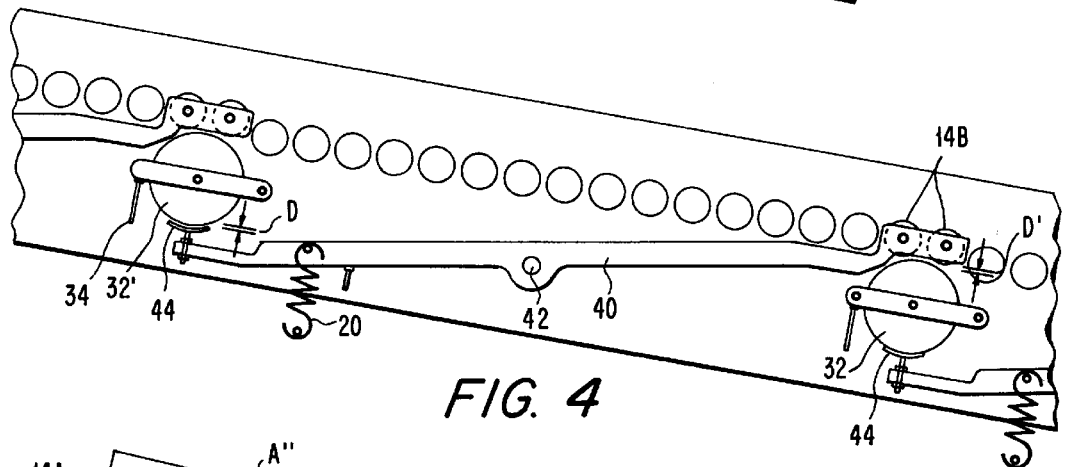
FIG. 4 is a side elevational view of a gravity conveyor according to a second embodiment of the invention.
Figure 5:
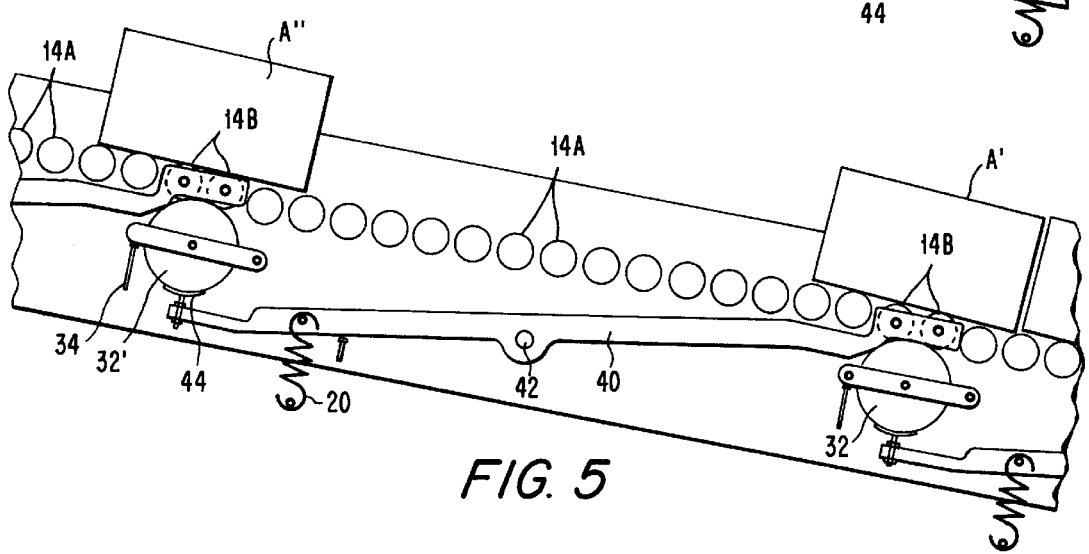
FIG. 5 is a view similar to FIG. 4 depicting the braking of articles being conveyed.

To deal with that shortcoming, another embodiment of the present invention depicted in FIGS. 4 and 5 employs, in lieu of the frame 16, a frame 40 in the form of a lever. The frame 40 is pivotally mounted to the walls 12 intermediate its upstream and downstream ends, and the downstream end carries a pair of weight-sensitive rotary elements 14B which operate similar to those describe earlier herein. The upstream end of the frame 40 carries a brake pad 44 adapted to bear against an upstream brake roller 32'.

Normally, the brake pad 44 is spaced beneath the brake roller 32' by a distance D which is smaller than a distance D' between the weight-sensitive rotary elements 14B and the downstream brake roller 32. In the event that an article A' shown in FIG. 5 as disposed atop the weight-sensitive rotary elements 14B is heavy enough to overcome the bias of the spring 20, the weight-sensitive rollers will be depressed downwardly into contact with the brake roller 32. Prior to that contact occurring, however, the brake pad 44 located at the upstream end of the frame 40 will contact the upstream brake roller 32' and raise that brake roller upwardly into contact with the upstream weight-sensitive rollers 14B, as shown in FIG. 5.

Therefore, the upstream weight-sensitive rotary elements 14B will perform a braking function on any article A" disposed thereon, regardless of whether the article A" is in motion or not. If the article A" is not in motion, the fact that the brake pad 44 prevents rotation of the upstream brake roller 32' will hold the article A" at rest, until the downstream article A' moves off the weight-sensitive rotary elements 14B.

Figure 7:
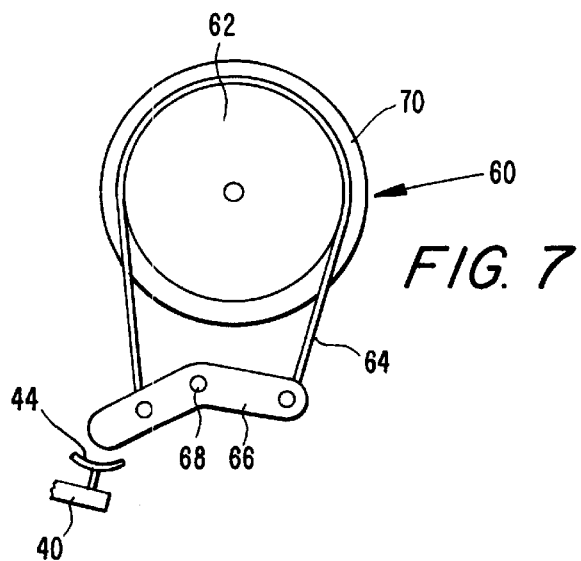
FIG. 7 is a side elevational view of an alternative form of brake roller that can be employed in accordance with the present invention.
Figure 8:
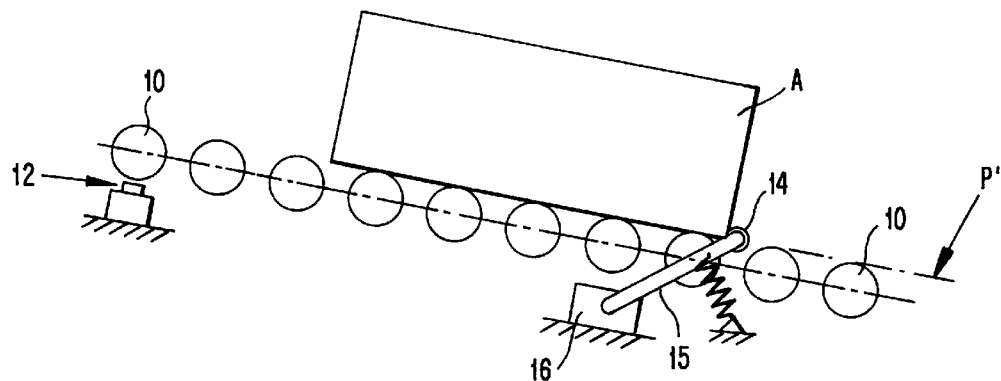
FIG. 8 is a side elevational view of a prior art gravity conveyor.

In lieu of a gravity type of brake roller 32, 32', there could instead be employed a band brake 60 of the type shown in FIG. 7. That band brake includes a rotary drum 62 around which a brake band 64 is wrapped. The ends of the brake band 64 are attached to a lever 66 which is pivoted by a pin 68 at a location intermediate it's end. The pad 44 of the frame 40 would be arranged below one end of the lever, so that upward motion of the pad 44 causes the lever 66 to pivot about the pin 68 thereby tightening the band around the drum 62 to perform a braking action. A larger diameter portion 70 of the drum would contact the weight-sensitive rotary elements 14B.

It will be appreciated that the embodiment of the invention disclosed in connection with FIGS. 4 and 5 not only provides velocity control, but also back pressure control.

Figure 6:
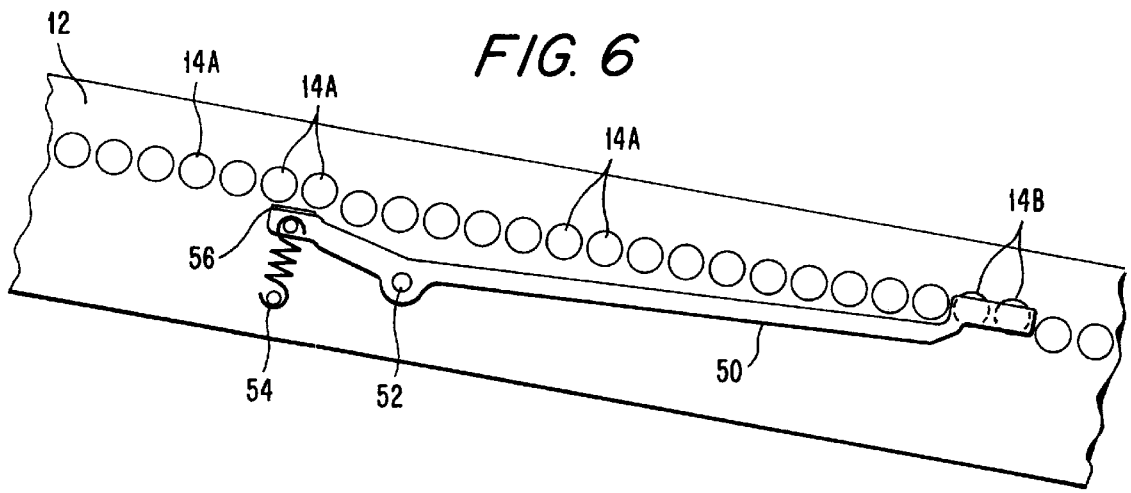
FIG. 6 is a side elevational view of a third embodiment of the invention.

In accordance with another embodiment of the present invention, a braking mechanism can be provided which provides back pressure relief, but no velocity control. Such an embodiment is depicted in FIG. 6 wherein a frame 50 supports a pair of weight-sensitive rotary elements 14B at its downstream end. The frame 50 is pivotally mounted by a pin 52 located intermediate the upstream and downstream ends of the frame 50. The upstream end of the frame 50 is biased downwardly by a spring 54. The upstream end of the frame 50 carries a brake pad 56 which underlies one or more of the rotary elements. It will be appreciated that when the weight-sensitive rotary elements 14B are displaced downwardly by an article of sufficient weight, the brake pad 56 will be raised into direct braking contact with the rollers 14A in order to apply a braking force to an upstream article. It is noted that the length of the frame 50 disposed on the downstream side of the pivot 52 as longer than the length of the frame disposed on the upstream side of the pivot 52. Hence a mechanical advantage is achieved whereby an article can apply an enhanced braking force to a heavier upstream article.

It will be appreciated that the present invention provides a simplified braking mechanism which provides speed control and/or back pressure control. Actuation of the braking action is achieved without presenting any upstanding obstacles which must be traversed by the articles, and which could thus function to excessively decelerate or even stop lighter weight articles.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A gravity conveyor for conveying articles, comprising freely rotatable rotary elements defining a downwardly inclined conveying path; some of the rotary elements comprising non-displaceable rotary elements rotatable about parallel stationary axes and arranged in groups; uppermost portions of the non-displaceable rotary elements in each group defining a profile plane; the profile planes of the upstream and downstream groups being non-coplanar with one another, with the rotary elements of the downstream group being offset downwardly with respect to the profile plane of the upstream group; the upstream and downstream groups being separated by a weight-sensitive one of the rotary elements; the weight-sensitive rotary element mounted for rotation about a displaceable axis oriented parallel to the stationary axes; biasing means applying an upward force to the weight-sensitive rotary element for positioning an uppermost portion of the weight-sensitive rotary element within the profile plane of the upstream group; a brake disposed beneath the weight-sensitive rotary element; the weight-sensitive rotary element being downwardly displaceable in response to being traversed by an article having a weight greater than the upward force of the biasing means to engage the brake and be braked thereby.

2. The gravity conveyor according to claim 1 wherein the profile planes of the upstream and downstream groups are parallel to one another.

3. The gravity conveyor according to claim 1 wherein the brake comprises a rotary brake roller.

4. The gravity conveyor according to claim 1 wherein there is at least a pair of weight-sensitive rotary elements disposed between successive ones of the groups, the pair being interconnected for simultaneous downward movement into contact with the brake.

5. The gravity conveyor according to claim 4 further including a frame to which the pair of weight-sensitive rotary elements is mounted.

6. The gravity conveyor according to claim 5 wherein the frame is mounted for pivotable movement about an axis oriented parallel to the axes of the rotary elements.

7. The gravity conveyor according to claim 6 wherein the biasing means comprises a spring acting on the frame.

8. The gravity conveyor according to claim 6 wherein the biasing means comprises a counterweight acting on the frame.

9. The gravity conveyor according to claim 1 wherein the brake constitutes a first brake; the conveyor further comprising a frame having upstream and downstream ends and mounted for pivotal movement about an axis located intermediate the upstream and downstream ends and extending parallel to the axes of the rotary elements; the weight-sensitive rotary element being mounted on the frame adjacent the downstream end thereof; a second brake disposed upstream of the first brake and being movable upwardly by the upstream end of the frame and into braking engagement with at least one of the rotary elements, when the weight-sensitive rotary element is displaced downwardly by an article.

10. The gravity conveyor according to claim 9 wherein the second brake is mounted on the downstream end of the frame.

11. The gravity conveyor according to claim 10 wherein the rotary element engageable by the second brake constitutes a non-displaceable one of the rotary elements.

12. The gravity conveyor according to claim 9 wherein the second brake constitutes a rotary brake roller; and the rotary element engageable by the rotary brake roller constitutes a weight-sensitive one of the rotary elements.

13. A gravity conveyor for conveying articles, comprising freely rotatable rotary elements defining a downwardly inclined conveying path; some of the rotary elements comprising non-displaceable rotary elements rotatable about parallel stationary axes and arranged in groups; uppermost portions of the non-displaceable rotary elements in each group defining a profile plane; the profile planes of the upstream and downstream groups being non-coplanar with one another, with the rotary elements of the downstream group being offset downwardly with respect to the profile plane of the upstream group; the upstream and downstream groups being separated by a weight-sensitive one of the rotary elements; the weight-sensitive rotary element mounted for rotation about a displaceable axis oriented parallel to the stationary axes; biasing means applying an upward force to the weight-sensitive rotary elements for positioning an uppermost portion of each weight-sensitive rotary element in the profile plane of the upstream group; a brake disposed beneath one of the 20 rotary elements spaced from the weight-sensitive rotary element and movable into braking engagement therewith in response to downward displacement of the weight-sensitive rotary element.

14. The gravity conveyor according to claim 13 wherein the rotary element engageable by the brake constitutes a non-displaceable one of the rotary elements.

15. The gravity conveyor according to claim 13 wherein the rotary element engageable by the brake is located upstream of the weight-sensitive rotary element.

16. The gravity conveyor according to claim 15, further including a frame having upstream and downstream ends, the weight-sensitive rotary element mounted on the frame adjacent the downstream end, an upstream end of the frame arranged to be raised to lift the brake into braking relationship in response to downward displacement of the weight-sensitive rotary element.

17. The gravity conveyor according to claim 16 wherein the brake is attached to the upstream end of the frame.

* * * * *